United States Patent
Saloio, Jr. et al.

(10) Patent No.: US 9,217,662 B2
(45) Date of Patent: Dec. 22, 2015

(54) VIBRATION SIGNAL COMPENSATION

(75) Inventors: James Saloio, Jr., Ludlow, MA (US); Robert E. Cox, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1148 days.

(21) Appl. No.: 13/222,671

(22) Filed: Aug. 31, 2011

(65) Prior Publication Data

US 2013/0054175 A1    Feb. 28, 2013

(51) Int. Cl.
*G01H 1/00* (2006.01)

(52) U.S. Cl.
CPC ..................... *G01H 1/006* (2013.01)

(58) Field of Classification Search
CPC .............. G01H 1/006; G01H 1/003
USPC ................................... 702/105, 106
See application file for complete search history.

(56) References Cited

U.S. PATENT DOCUMENTS

| | | | |
|---|---|---|---|
| 3,588,695 A | 6/1971 | Furfaro et al. | |
| 3,673,503 A | 6/1972 | Parker | |
| 4,063,450 A | 12/1977 | Lyons | |
| 4,196,358 A * | 4/1980 | Conover et al. | 327/411 |
| 4,485,678 A * | 12/1984 | Fanuele | 73/660 |
| 4,616,303 A * | 10/1986 | Mauthe | 363/60 |
| 4,795,927 A | 1/1989 | Morii et al. | |
| 5,668,317 A * | 9/1997 | Farine et al. | 73/497 |
| 5,733,103 A | 3/1998 | Wallace et al. | |
| 5,784,300 A | 7/1998 | Neumeier et al. | |
| 6,445,995 B1 | 9/2002 | Mollmann | |
| 6,522,991 B2 | 2/2003 | Banaszuk et al. | |
| 7,367,193 B1 | 5/2008 | Thompson | |
| 7,775,107 B2 | 8/2010 | Homquist | |
| 2003/0020460 A1 * | 1/2003 | Hsu et al. | 324/161 |
| 2004/0001015 A1 * | 1/2004 | Games | 341/112 |
| 2005/0017602 A1 * | 1/2005 | Arms et al. | 310/339 |
| 2005/0018858 A1 * | 1/2005 | John | 381/60 |
| 2007/0016385 A1 * | 1/2007 | Barila et al. | 702/142 |
| 2009/0089538 A1 * | 4/2009 | Yeh et al. | 711/211 |
| 2009/0110541 A1 | 4/2009 | Southwick et al. | |
| 2009/0285675 A1 | 11/2009 | Lewis et al. | |
| 2009/0301055 A1 | 12/2009 | Kallappa | |

OTHER PUBLICATIONS

"Calibration of filter responses in Linrad," linrad support, May 20, 2007 [retieved on Aug. 25, 2014] Retrieved from the Internet: <URL:https://web.archive.org/web/20070520140515/http://www.sm5bsz.com/linuxdsp/flat/ampcal.htm>.*

(Continued)

*Primary Examiner* — Sujoy Kundu
*Assistant Examiner* — Liam R Casey
(74) *Attorney, Agent, or Firm* — Kinney & Lange, P.A.

(57) ABSTRACT

A system comprises a vibration sensor for generating a vibration signal on a turbomachine, a signal conditioner for conditioning the vibration signal, and a test signal generator for calibrating the signal conditioner. The test signal generator calibrates the signal conditioner with a test signal having a base frequency and a modulation frequency. The signal conditioner introduces a phase error into the vibration signal, and the signal conditioner introduces a phase shift into the test signal. A processor compensates for the phase error in the vibration signal by correcting the vibration signal based on the phase shift in the test signal, where the processor determines the phase shift in the test signal based on harmonic analysis of the modulation frequency.

34 Claims, 6 Drawing Sheets

(56) References Cited

OTHER PUBLICATIONS

O'Haver. "Harmonic analysis and the Fourier Transform" Dec. 2008[retrieved on Apr. 5, 2015]. Retrieved from the Internet:<URL: http://web.archive.org/web/20081212231526/http://terpconnect.umd.edu/~toh/spectrum/HarmonicAnalysis.html>.*

Search Report from Application Serial No. GB1211940.0, mailed Oct. 30, 2012, 1 page.

* cited by examiner

VIBRATION SIGNAL COMPENSATION

BACKGROUND

This invention relates generally to turbomachinery, and specifically to turbine rotor vibrations. In particular, the invention concerns vibration signal processing for trim balancing and vibration reduction in gas turbine engines Gas turbine engines (or combustion turbines) are built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation and industrial power generation. Small-scale engines including auxiliary power units typically utilize a one-spool design, with co-rotating compressor and turbine sections. Larger-scale jet engines and industrial gas turbines (IGTs) are generally arranged into a number of coaxially nested spools, which operate at different pressures and temperatures, and rotate at different speeds.

Individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Ground-based industrial gas turbines can be quite large, utilizing complex spooling systems for increased efficiency. Power is delivered via an output shaft connected to an electrical generator, or other mechanical load. Industrial turbines can also be configured for combined-cycle operation, in which additional energy is extracted from the exhaust stream, for example using a low pressure steam turbine.

Aviation applications include turbojet, turbofan, turboprop and turboshaft engines. In turbojet engines, thrust is generated primarily from the exhaust. Modern fixed-wing aircraft typically employ turbofan and turboprop engines, in which the low pressure spool is coupled to a propulsion fan or propeller. Turboshaft engines are used on rotary-wing aircraft, including helicopters.

Turbofan engines are commonly divided into high and low bypass designs. High bypass turbofans generate thrust primarily from the fan, which drives airflow through a bypass duct oriented around the engine core. This configuration is common on commercial aircraft and military transports, where noise and fuel efficiency are primary concerns. Low bypass turbofans generate proportionally more thrust from the exhaust flow, providing greater specific thrust for use on supersonic fighters and other high-performance aircraft. Unducted (open rotor) turbofans and ducted turboprop designs are also known, including counter-rotating and aft-mounted configurations.

Gas turbine engine performance depends on precise control of the turbine and compressor rotor speeds. When the rotors are out of balance, vibrations result, reducing engine efficiency and service life. To address these effects, vibration sensors are used to detect rotor imbalances, with vibration signal processors designed to generate effective trim balance solutions for improved performance and service life.

SUMMARY

This invention concerns a vibration system for a turbomachine, and methods for using the system. The system includes a vibration sensor, a signal conditioner, a test signal generator and a processor.

The vibration sensor is positioned on or proximate the turbomachine, in order to generate a vibration signal. The signal conditioner conditions the vibration signal, introducing a phase error.

The test signal generator calibrates the signal conditioner with a test signal, where the test signal has a base frequency and is modulated at a modulation frequency. The signal conditioner introduces a phase shift into the test signal.

The processor compensates for the phase error in the vibration signal based on the phase shift in the test signal. To determine the phase shift, the processor performs a harmonic analysis on the test signal, based on harmonics of the modulation frequency.

DETAILED DESCRIPTION

Figure 1:
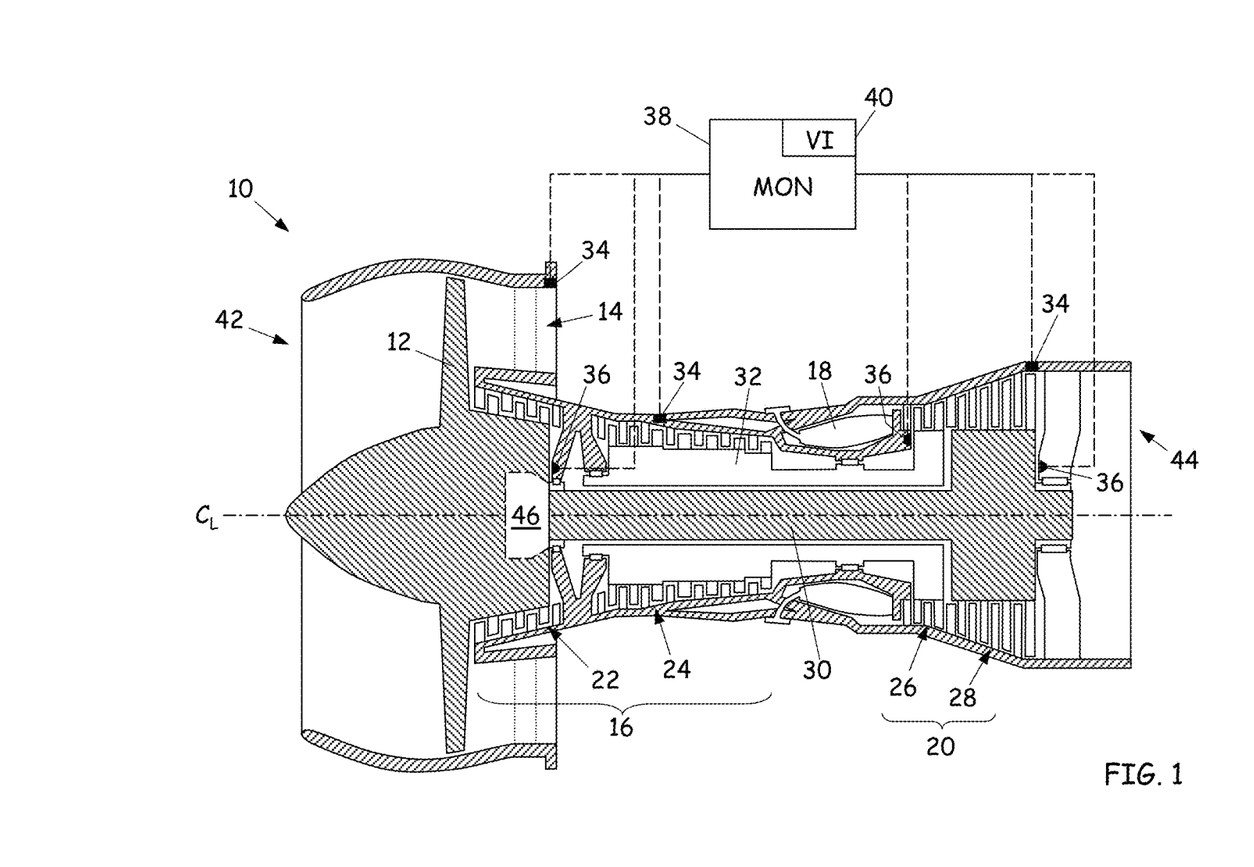
FIG. 1 is a cross-sectional view of a gas turbine engine with a prognostic health monitoring unit having a vibration interface for improved trim balance.

FIG. 1 is a cross-sectional view of gas turbine engine 10, in a turbofan configuration. In this configuration, gas turbine engine 10 includes propulsion fan 12 with bypass duct 14, compressor section 16, combustor 18 and turbine section 20.

In the two-spool, high bypass configuration of FIG. 1, compressor section 16 includes low pressure compressor (LPC) 22 and high pressure compressor (HPC) 24. Turbine section 20 comprises high pressure turbine (HPT) 26 and low pressure turbine (LPT) 28. Low pressure compressor 22 is rotationally coupled to low pressure turbine 28 via low pressure (LP) shaft 30, forming the LP spool or low spool. High pressure compressor 24 is rotationally coupled to high pressure turbine 26 via high pressure (HP) shaft 32, forming the HP spool or high spool.

Vibration sensors 34 comprise piezoelectric accelerometers or other vibration-sensitive devices positioned to sense vibrations of gas turbine engine 10, for example on the fan, compressor and turbine casing, as shown in FIG. 1. Speed sensors 36 may be positioned to sense the rotational speeds of fan 12, low pressure shaft 30 and high pressure shaft 32, as depicted in the example of FIG. 1. Speed sensors 36 refer to sensors that can detect a position or change in position over a period of time for a shaft or other rotating component. While several example locations are depicted in FIG. 1 for vibration sensors 34 and speed sensors 36, it will be understood that other quantities and/or locations are contemplated, such as speed or vibration signals derived through a gearbox and/or gearbox vibration or speed sensor locations.

Monitoring unit (MON) 38 collects operational data from gas turbine engine 10, including vibration signals from vibration sensors 34 and speed signals from speed sensors 36. Prognostic health monitoring unit 38 includes vibration interface (VI) 40, which is configured to compensate for phase errors (or timing variations) in the vibration signals, as described below, in order to improve trim balance solutions for more efficient operation of gas turbine engine 10.

In particular, MON 38 utilizes vibration interface 40 to calibrate the vibration signal conditioning electronics, compensating for errors in the phase of the vibration signal by correcting for offsets introduced along the signal processing chain. The phase of the vibration signal is correlated with the particular section (or angular sector) of the rotor that is out of balance. Thus, reducing the phase error improves trim balance by more accurately identifying where the rotor is out of balance, so that imbalances can be more accurately identified and corrected, reducing engine vibrations.

In operation of gas turbine engine 10, fan 12 accelerates air flow from inlet 42 through bypass duct 14, generating thrust. The core airflow is compressed in low pressure compressor 22 and high pressure compressor 24, then mixed with fuel in combustor 18 and ignited to generate combustion gas. The combustion gas expands to drive high and low pressure turbines 26 and 28, which are rotationally coupled to high pressure compressor 24 and low pressure compressor 22, respectively. Expanded combustion gases exit through exhaust nozzle 44, which is shaped to generate additional thrust from the downstream exhaust gas flow.

Low pressure compressor 22 is coupled to propulsion fan 12 along low pressure shaft 32. In advanced turbofan designs, low pressure shaft 32 may be coupled to fan 12 via geared drive mechanism 46, providing improved fan speed control for increased efficiency and reduced engine noise. Propulsion fan 12 can also function as a first-stage compressor for gas turbine engine 10, with low pressure compressor 22 performing as an intermediate-stage compressor or booster. Alternatively, the low pressure compressor stages may be absent, and air from fan 12 is provided directly to high pressure compressor 24, or to an independently rotating intermediate compressor spool.

Gas turbine engine 10 thus encompasses a range of different shaft and spool geometries, including one-spool, two-spool and three-spool configurations, in both co-rotating and counter-rotating designs. Gas turbine engine 10 may also be configured as a high bypass or low bypass turbofan, a turbojet, turboshaft or a turboprop engine, an auxiliary power unit or a multiple-spool industrial gas turbine. In each of these designs, prognostic health monitoring unit 38 improves engine performance and service life by utilizing vibration interface 40 to compensate for phase variations in the signals from vibration sensors 34, improving trim balance solutions for compressor section 16 and turbine section 20, or for fan section 12.

Figure 2:
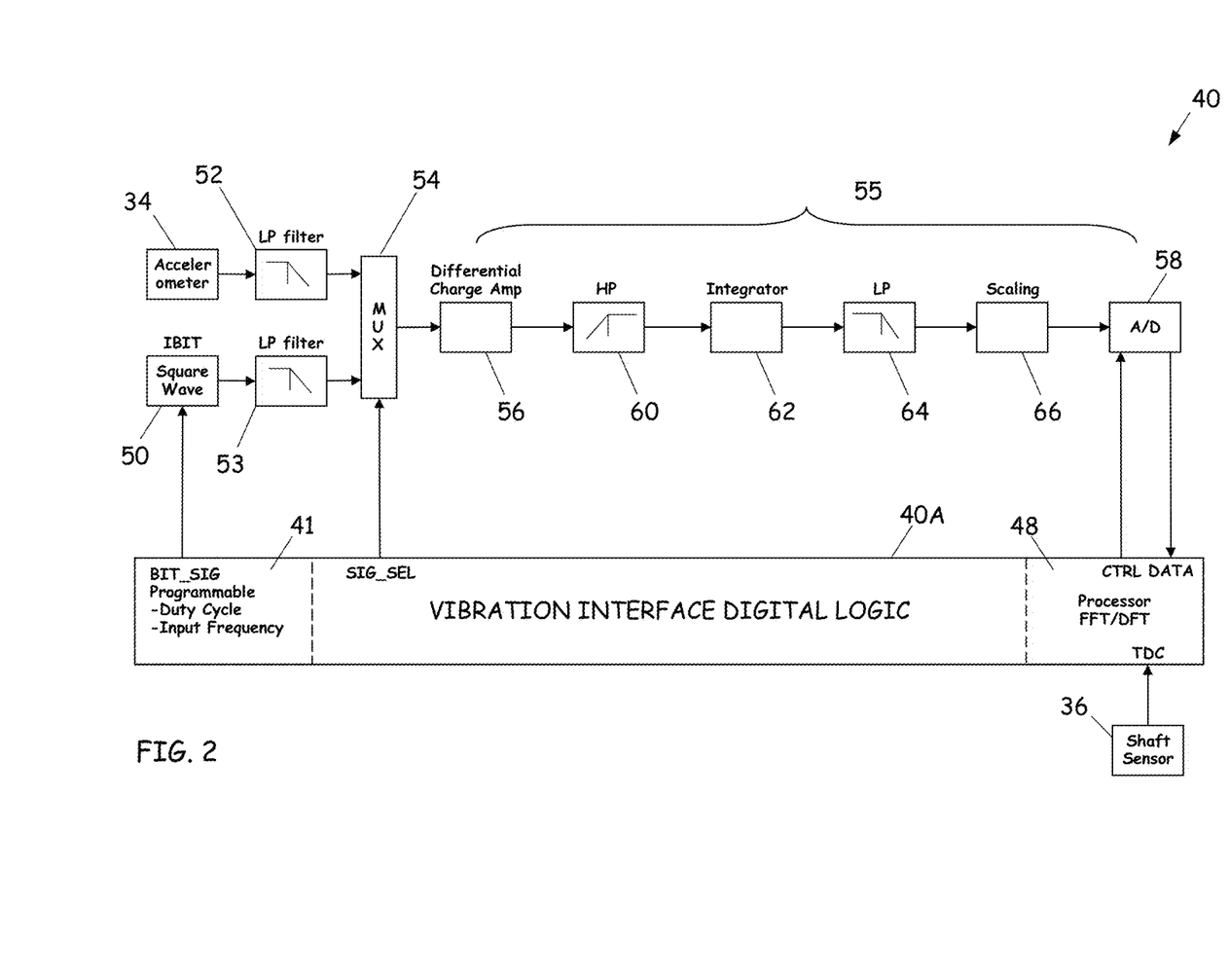
FIG. 2 is a block diagram of a prognostic health monitoring unit with a vibration interface.

FIG. 2 is a block diagram of vibration interface 40 with digital logic section 40A having programmable BIT (built-in test) signal generator 41 and processor (or data acquisition) block 48. Vibration interface 40 also includes square wave test signal generator 50, matching low pass (LP) filters 52 and 53, and multiplexer (mux) 54. Multiplexer 54 switches between vibration (accelerometer 34) and test signal (square wave generator 50) injection modes for signal conditioning electronics 55, with differential charge amplifier 56 and analog/digital converter (A/D) 58.

In this configuration, accelerometer 34 and square wave generator 50 may produce differential signals. Alternatively, accelerometer 34 and square wave generator 50 may produce single-ended signals, and charge amplifier 56 is a single-ended amplifier.

Vibration interface 40 generates trim balance solutions for a gas turbine engine or turbomachine, based on vibration signals having a characteristic vibration frequency, amplitude and phase, as generated by vibration sensor 34. Signal conditioner 55 provides analog signal processing to interface with each vibration sensor 34, and to filter, shape, integrate, scale and band-limit the vibration signals for digitization by A/D 58. Signal conditioner 55 thus acts as an analog transfer function for signals generated by differential charge amplifier 56, conditioning the signals for digitization by A/D 58.

Processor (or processor block) 48 processes digitized vibration signals (DATA) from A/D 58, in conjunction with a blade index position or top dead center (TDC) signal from speed sensor 36, for example using a magnetic pickup sensor. This allows the phase of the vibration signal to be determined with respect to the physical shaft configuration, in order to provide trim balance solutions directed to specific sectors or blades on the turbine, compressor and fan rotors.

Signal conditioner 55 extends in an analog processing chain from differential charge amplifier 56 to A/D 58, providing a number of signal conditioning blocks, modules or stages including one or more of high pass (HP) stage 60, integrator 62, low pass stage 64 and scaling or gain 66. It will be understood that each of the blocks 60-66 can be comprised of multiple stages and may be arranged or distributed in a different order than depicted in FIG. 2. Due to temperature effects and natural variation within the nominal tolerance ranges of the corresponding components, signal conditioner 55 also introduces phase variations (or phase errors) into the vibration signals. Because signal conditioning is frequency dependent, moreover, the phase shift depends on vibration frequency. Similarly, amplitude or gain shifts (or gain errors) can also be realized due to the same effects and conditions.

Trim balance is typically provided during maintenance operations, for example by adjusting blade positions, drilling holes, milling balance lands or installing counterweights. Real-time trim balancing systems are also known. Regardless of implementation, however, trim balance requires the overall phase error to be minimized, in order to correctly identify the correct turbine and compressor components for balancing.

To address this issue, vibration interface 40 includes digital logic section 40A with programmable built-in-test (BIT) signal generator 41, in order to calibrate signal conditioning electronics 55 by injecting pulse-width modulated test signal BIT_SIG via square wave generator 50. Test signal BIT_SIG includes a programmable (variable or modulated) pulse width at a base frequency, with amplitude modulation at a programmable modulation frequency.

Multiplexer 54 switches between vibration signals from vibration sensor 34 and test signals from square wave generator 50, based on select signal SIG_SEL from digital logic section 40A of vibration interface 40. The digital support logic can be implemented via an ASIC (FPGA), or by a micro-controller/DSP, etc., with programmable digital output capability.

In general, vibration interface 40 serves a number of independent vibration sensors 34 with separate signal conditioners (or signal processing channels) 55, with signal processing characteristics matched to the frequency and amplitude output of each individual vibration sensor 34. One or more multiplexers 54 are utilized to switch between vibration and test signals in each separate channel, with test signal modulation frequency and duty cycle determined according to the characteristic signals from each vibration sensor 34, and the frequency and amplitude characteristics of each corresponding signal conditioner 55.

Alternatively, a single multiplexer 54 is used to multiplex more than one vibration sensor and bit signal generator. That is, multiple vibration sensors multiplexed into a single signal conditioning path. This topology would be dependent on the timing/throughput requirements of the given system.

The test signals are thus conditioned along the same analog signal processing chain (signal conditioner 55) as the vibration signals, introducing a frequency-dependent phase shift that corresponds to the phase error in vibration signals from vibration sensor 34. Similarly, signal conditioner 55 may also introduce a frequency-dependent gain shift into the test signal, corresponding to the gain error in the vibration signals. Processor 48 analyzes the test signals (DATA) after digitization by A/D 58, and determines the phase shift (or gain shift) based on harmonic analysis of the modulation frequency, for example using a fast Fourier transform (FFT) or discrete Fourier transform (DFT).

To compensate for the phase error in vibration signals from vibration sensors 34, processor 48 clocks or triggers A/D 58 based on the rising (or falling) edge of test signal BIT_SIG, at the modulation frequency, using control signal CTRL to start data to start A/D acquisition (digitization) by A/D 58. This provides an absolute measure of the phase shift introduced into the test signal by signal conditioner 55, where the phase shift is as a function of frequency as determined by the harmonic analysis.

Depending on configuration, the synchronization signal can be generated by the modulation signal generator, for example on the rising or falling edge of modulation signal F_MOD. There is a phase difference (e.g., 180°), depending on whether the positive or negative slope is used, but the phase shift can be measured using either signal. The synchronization signal can also be generated at a zero crossing of the test signal at the modulation frequency, for example at a zero crossing on either the positive or negative slope of modulation signal F_MOD.

Alternatively, the start of data acquisition can be synchronized or time-correlated to the test signal (F_MOD) using a high resolution digital counter to time-stamp both the start of the test signal at the modulation frequency (that is, the rising or falling edge of modulation signal F_MOD) and the start of A/D data buffer acquisition by A/D converter 58. Processor 48 then compensates for phase errors in the vibration signals by adjusting the vibration phase based on the corresponding phase shift in the test signal, where both the phase shift and the phase error are determined as a function of the vibration frequency and the time stamps.

In one application, vibration interface 40 utilizes three separate vibration channels, with three separate vibration sensors 34 to provide data from a fan station, a turbine station (e.g., LPT or HPT), and an optional (or provisional) engine location (e.g., LPC or HPC, or a combustor or nozzle station). Analog signal conditioning electronics 55 provide a 1 dB or 3 dB bandwidth of about 10-2000 Hz or 10-3800 Hz, depending on sensor configuration and engine station in this example. The velocity scaling varies depending on signal frequency and amplitude, with a range of about 100-500 mV/ips (millivolt per inch/sec) or about 40-200 mV per cm/sec, for example about 290 or 291 mV/ips (114-115 mV per cm/sec).

To achieve accurate trim balance, the phase error allotted to the vibration electronics may be limited to less than two electrical degrees, for example ±1°, over a typical vibration frequency range of about 10-210 Hz. The electronic tolerances required to meet this limit may become unreasonable, however, so vibration interface 40 utilizes test signal generator 41 and square wave generator 50 to reduce phase errors by calibrating signal conditioning electronics 55 with a PWM test signal, as described above.

Vibration interface 40 performs phase calibrations at system initialization (or engine startup), and compensates for frequency-dependent phase errors during flight operations. To characterize phase errors over the expected once-per-revolution (1/rev) range of 10-210 Hz, a 10 Hz frequency-modulated BIT signal is generated, with amplitude and phase calculated at up to ten additional odd harmonics by using a Fourier transform to process the A/D signal.

BIT signal generator 41 generates the test signal by transmitting programmable duty cycle and frequency instructions to square wave generator 50, which generates corresponding test signals for each of the different vibration sensor channels. Signals from vibration sensor 34 and square wave generator 50 are processed in low pass filter 52 and matching filter 53, respectively, and multiplexer 54 selects the appropriate filtered signal for injection into differential amplifier 56, based on selection signal SIG_SEL.

Processor 48 determines the frequency and phase characteristics of the conditioned vibration and test signals, after digitization by A/D 58. These characteristics include the phase shift in the test signal, as a function of frequency, based on harmonic analysis of the modulation frequency.

The results are used to produce a phase versus frequency compensation curve or lookup table, for use during trim balance acquisition. Phase errors in the analog signal processing path can then be compensated out, based on the known gain and phase characteristics of the square wave test signal, and its harmonics. Using the PWM method to vary the amplitude of the test signal output, moreover, as described below, additional BIT modulation frequencies can be used. This provides additional coverage of frequencies both within and beyond the bandwidth of each vibration sensor 34, and the corresponding components of signal conditioning electronics 55.

Figure 3A:
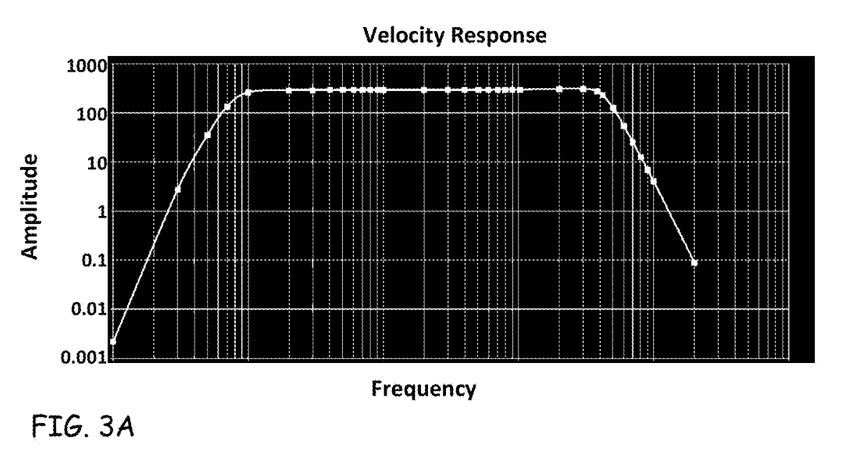
FIG. 3A is a plot of velocity response versus frequency.

FIG. 3A is a plot of velocity response versus frequency. The amplitude of the velocity response curve is given along the vertical axis in mV/ips, with frequency along the horizontal, using an arbitrary log scale.

The particulars of the velocity response curve depend on the signal conditioning electronics, as described above. As shown in FIG. 3A, the nominal response amplitude exhibits a central plateau or substantially flat region, with a bandwidth (1 or 3 dB) of about 10-2000 Hz, or about 10-3800 Hz as a passband. Depending on application, the lower cutoff frequency ranges from about 5-20 Hz, 10-20 Hz or 10-40 Hz, for example about 5-15 Hz, and the higher cutoff frequency about 1-2 kHz or 1-5 kHz, for example about 2.0-2.5 kHz. While the passband appears substantially flat at a constant amplitude for the example nominal response of FIG. 3A, the actual amplitude response for a particular instance of vibration interface 40 may vary based on temperature, component values or other effects. The compensation techniques as described further herein for phase compensation can also be applied to correct gain errors and gain shifts to compensate amplitude response.

The velocity response curve is substantially constant over the bandwidth plateau, for example between about 100 mV/ips and about 1000 mV/ips (about 40-400 mV per cm/s), or between 300-400 mV/ips (about 120-160 mV per cm/s). Outside the central plateau (or bandwidth), the velocity response is lower.

Figure 3B:
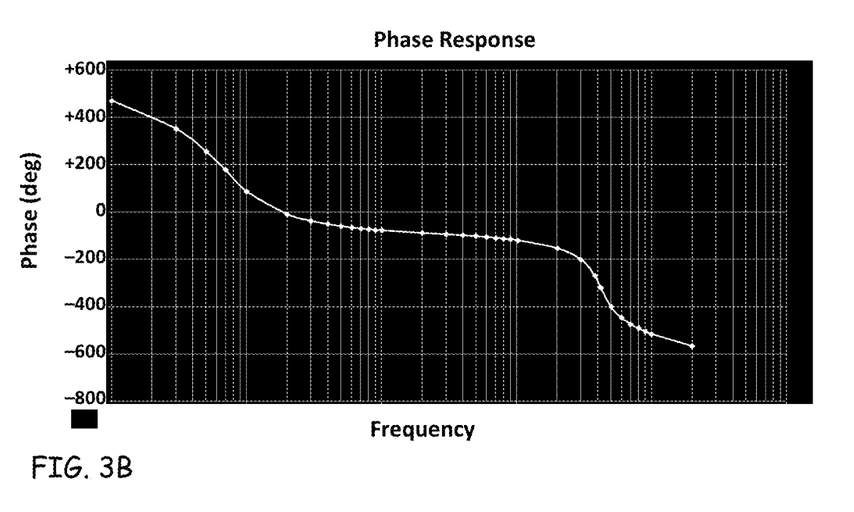
FIG. 3B is a plot of phase response versus frequency.

FIG. 3B is a plot of phase response versus frequency. The phase response is given along the vertical axis in degrees (deg), with frequency along the horizontal, using an arbitrary log scale.

Phase response also depends on the signal conditioning electronics. As shown in FIG. 3B, the nominal phase response may not have a substantially flat plateau, but may instead exhibit a central slope or inclined region, with increased gradients at either end. In one particular configuration, the central region corresponds to the nominal response bandwidth of FIG. 3A, for example from about 10 Hz to about 2000-3800 Hz, over a phase range of about 360° (2π radians). Alternatively, the central phase response region has a more limited frequency range, for example from about 20-50 Hz to about 1000-2000 Hz, over a phase range of about 180° (or π radians).

In each of FIGS. 3A and 3B, the velocity and phase response characteristics are representative of a turbofan or other gas turbine engine application, with a vibration critical frequency range of about 10-210 Hz. In other applications, the vibration frequencies and bandwidths vary, along with the corresponding velocity and phase characteristics.

Figure 4:
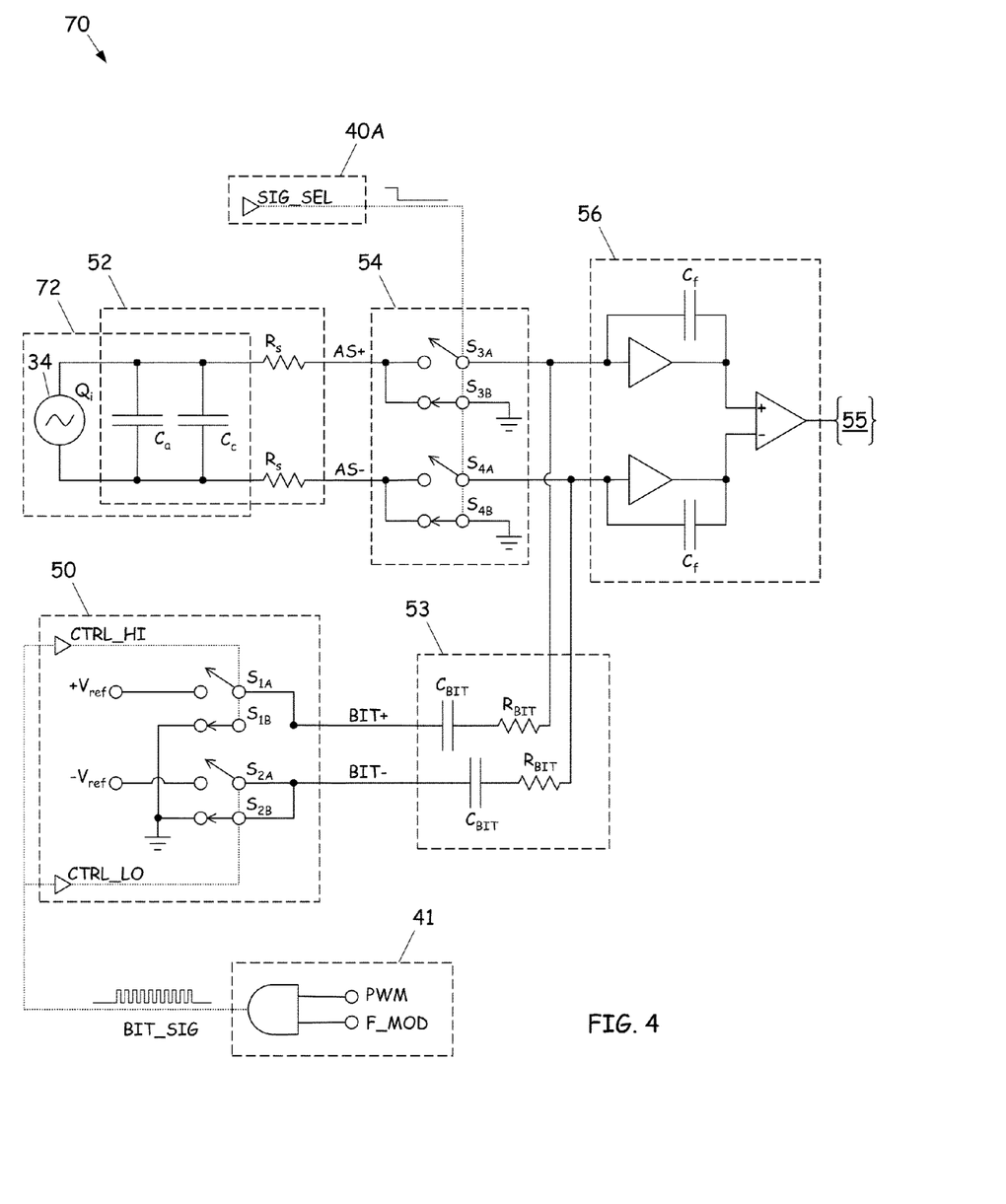
FIG. 4 is a schematic diagram of a phase compensation test signal circuit.

FIG. 4 is a schematic diagram of phase compensation vibration circuit (or vibration channel) 70. An independent accelerometer and cable equivalence circuit 72 for each vibration channel is depicted as representative of the vibration sensor 34 and associated cables, which form in part the corresponding low pass vibration signal filter 52.

BIT injection circuit (or square wave generator) 50 includes a matching low pass filter 53 for each separate vibration channel. Multiplexer 54 switches between the vibration signals and test pulses for injection into simplified input charge (differential) amplifier circuit 56, with analog signal conditioning provided by signal processing electronics 55.

Accelerometer equivalence circuit 72 includes variable AC (oscillating) charge source Qi to model individual vibration sensors (accelerometers) 34, along with the associated vibration signal electronics. Equivalent sensor and cable capacitances Ca and Cc are arranged in parallel across the differential signal outputs of vibration sensor 34.

Low pass vibration signal filter 52 includes sensor and cable capacitances Ca and Cc, with series resistors Rs on each signal line. Low pass filter 52 dampens resonances in differential vibration signals AS+ and AS−, prior to injection into charge amplifier 56.

BIT injection circuit 50 utilizes analog switch pairs S1A/B and S2A/B to switch differential test signals BIT+ and BIT− between ground and reference voltages +Vref and −Vref, respectively. Switching is based on control signals CTRL_HI and CTRL_LO from programmable pulse width modulator/BIT signal generator 41.

Control signals CTRL_HI and CTRL_LO are based on test generator signal BIT_SIG, which is generated as a PWM (variable pulse width), frequency modulated square wave signal chain, as described below (see FIG. 5A). When BIT_SIG is high, CTRL_HI directs switch pair S1A/B to switch positive differential test signal BIT+ to positive reference voltage +Vref, and CTRL_LO directs switch pair S2A/B to switch negative differential test signal BIT− to negative reference voltage −Vref. When BIT_SIG is low, control signals CTRL_HI and CTRL_LO direct switch pairs S1A/B and S2A/B to ground differential test signals BIT+ and BIT−, resulting in a rapidly switching, differential test signal with pulse width and frequency modulation characteristics given by test signal BIT_SIG, and amplitude given by the difference between +Vref and −Vref.

Since one of each switch pair S1A/B and S2A/B is normally open and the other is normally closed, a single BIT control signal BIT_SIG can be used to control both switch pairs, with CTRL_HI=CTRL_LO=BIT_SIG. In one such design, control signal BIT_SIG is generated by a logical AND of pulse width modulated signal PWM and frequency modulated signal F_MOD, as shown in FIG. 4. Alternatively, one or both of control signals CTRL_HI and CTRL_LO has a different polarity, depending on switch configuration and desired waveform, and signal generator 41 may generate independent control signals CTRL_HI and CTRL_LO.

Matching filter 53 provides equivalent capacitance CBIT and equivalent resistance RBIT to match the gain and phase characteristics of corresponding low pass vibration signal filter 52. Thus, matching filter 53 matches the signal path characteristics of test signals BIT+ and BIT−, as generated by test signal generator 41 and square wave generator 50, with those of vibration signals AS+ and AS−, as generated by accelerometer equivalence circuit 72.

Multiplexer 54 includes analog switch pairs S3A/B and S4A/B to switch between differential accelerometer signals AS+/AS− and differential test signals BIT+/BIT−, based on selection signal SIG_SEL from vibration interface digital logic section 40A. In test or calibration mode, SIG_SEL is low, and multiplexer 54 shunts vibration signals AS+/AS− to ground, as shown in FIG. 4, in order to prevent summing the vibration and test signals. In data acquisition or running mode, SIG_SEL is high, and multiplexer 54 passes accelerator signals AS+/AS− to the input of differential charge amplifier 54. Alternatively, the polarity of selection signal SIG_SEL is reversed, depending on the configuration of analog switch pairs S1A/B-S4A/B.

Differential test signals BIT+ and BIT− are disabled in data acquisition mode, for example by switching off test signal BIT_SIG, and directing analog switch pairs S1A/B and S2A/B to pin the inputs to matching low pass filter 53 to ground. In other designs, mode selection signal SIG_SEL (or other control signal) is used to disable reference voltage outputs ±Vref.

In test mode, the positive differential input (upper leg) of differential charge amplifier 56 switches between +Vref and ground, based on positive differential test signal BIT+. The negative differential input (lower leg) switches between −Vref and ground, based on negative differential test signal BIT−. In data acquisition mode, accelerometer signals AS+ and AS− are passed to the positive and negative differential inputs, respectively.

Figure 5A:
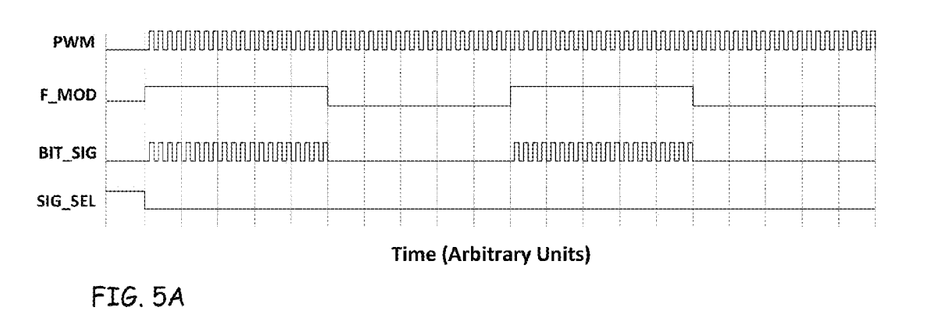
FIG. 5A is a pulse width modulated test signal diagram.

FIG. 5A is a PWM test signal diagram, plotted against time (in arbitrary units). The signals include pulse with modulated signal PWM, modulation frequency signal F_MOD, built-in test signal BIT_SIG, and selection signal SIG_SEL to switch between test and vibration signals.

Signals PWM, F_MOD, BIT_SIG and SIG_SEL are not to scale, and the relative pulse widths are merely representative. In particular, the pulse width of signal PWM is exaggerated to illustrate the shape of the waveform, while the actual base frequency may be up to three to four orders of magnitude higher than that of frequency modulation signal F_MOD.

The PWM base frequency is typically selected to be substantially higher than the bandwidth of the signal conditioning electronics, for example about 40 kHz, as compared to an upper-end bandwidth of about 4 kHz or less. Alternatively, the base frequency varies, for example from 10-20 kHz, 10-40 kHz or 40-100 kHz, or from 10-100 kHz. As a result, the PWM frequency and its harmonic components are filtered out by the signal conditioning electronics, and do not affect the phase compensation algorithm.

Pulse-width modulation signal PWM has a variable duty cycle ranging between 0 and 100%, which determines the relative pulse width as a function of the base period. The base period is 25 μs at 40 kHz, and varies inversely with the base frequency.

The PWM signal is modulated on and off by square-wave modulation frequency signal F_MOD, generating BIT test signal BIT_SIG. When SIG_SEL is switched to test mode (for example, held low, as shown in FIG. 5A), test signal BIT_SIG is injected into the differential charge amplifier. When SIG_SEL is switched to data acquisition mode (for example, held high), test signal BIT_SIG is shunted or disabled, and the vibration signals are passed to the signal conditioning electronics.

Figure 5B:
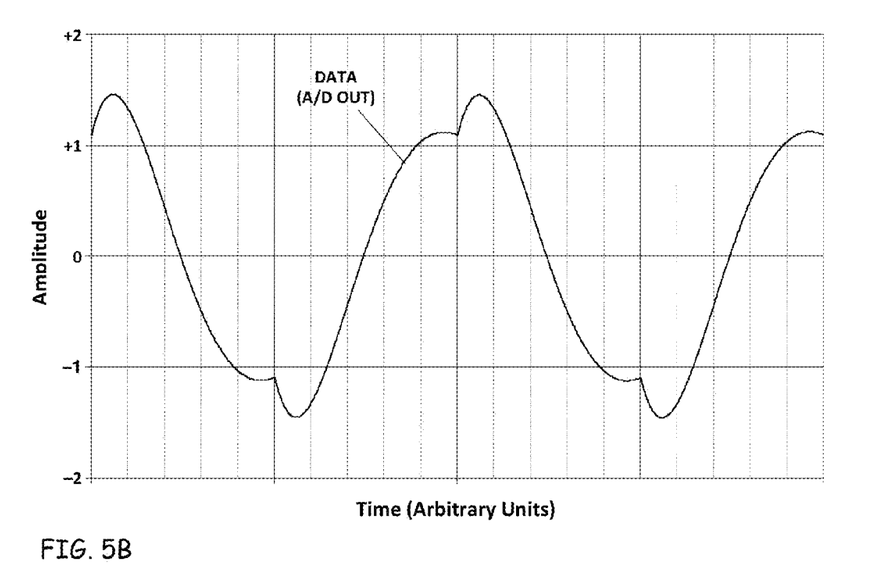
FIG. 5B is a plot of a conditioned test signal output.

FIG. 5B is a plot of a conditioned test signal output, after integration and digitization. The amplitude of the A/D output is given on the vertical axis, with time on the horizontal, both in arbitrary units. As shown in FIG. 5B, the analog signal conditioning chain filters out the base frequency and integrates over the modulated square wave pulse chain, generating a continuous, quasi-sinusoidal A/D output signal (A/D_OUT or DATA), where the integrated test signal is periodic at the modulation frequency and includes harmonic content that is dependent on the selected modulation frequency and signal conditioning transfer function.

For phase synchronization, A/D data acquisition is triggered based on the rising or falling edge of test signal BIT_SIG, as described above. Phase offsets in the test signal are determined from the conditioned test signal (A/D OUT), and used to compensate for (or "calibrate out") errors and time shifts in the analog signal conditioning electronics.

To illustrate this process, the phase offset of the test signal is plotted against frequency (see FIG. 6B), in order to generate a functional response or lookup table to compensate for phase errors in the actual vibration signals. The phase of the vibration signal is then adjusted based on the offset in the test signal, where the offset mimics the phase error because the test signal is processed by the same signal conditioning electronics as the actual vibration signals.

Because signal conditioning is frequency dependent, the compensation is performed as a function of vibration frequency. The frequency dependence of the phase offsets is determined by harmonic analysis of the test signal, for example using a Fourier analysis to evaluate odd harmonics of the modulation frequency.

The amplitude and pulse shape of the conditioned test signal are determined by the duty cycle of the PWM pulse and the modulation frequency, based on the particular electronics components used in the analog signal conditioning (or pulse shaping) chain. In particular, the conditioned signal frequency is the same as the modulation frequency, and the amplitude is a function of the duty cycle of the PWM signal. The duty cycle determines the total charge (or current) delivered to differential charge amplifier 56, and thus the test signal amplitude input to integrator 62 of signal conditioner 55.

Due to integrator 62, the signal gain typically decreases with frequency, for example in an inverse linear relationship (i.e., halving each time the frequency doubles). To prevent saturation of the test signal, and to enhance response across a broad frequency range, the PWM signal can programmed with a relatively low duty cycle (approaching zero) at low modulation frequencies, for example about 10-40 Hz, with a relatively high duty cycle (approaching 100%) at high modulation frequencies, for example 40-100 Hz, or above 100 Hz.

The PWM technique thus reduces circuitry requirements by using the duty cycle to control the conditioned (or integrated) test signal amplitude, eliminating the need to generate and switch in multiple reference voltages ±Vref. A critical trim balance frequency range of 10-210 Hz can also be effectively calibrated and compensated using a single modulation (input) frequency, for example about 10 Hz, with phase composition at higher frequencies based on an FFT or DFT transform, or other harmonic analysis.

In some applications the critical trim balance frequency range varies, for example from about 10-250 Hz or about 20-200 Hz, or from a lower limit of 10-100 Hz to an upper limit of 200-500 Hz. In some of these applications, additional modulation frequencies are used, in order to test the signal conditioning electronics at frequencies of interest both within and beyond the trim balance frequency range, for example from 5-20 Hz at the low end, and up to 1000 Hz or more at the upper end. The same frequencies or other frequencies can be used for gain based compensation to adjust vibration amplitudes.

Figure 6A:
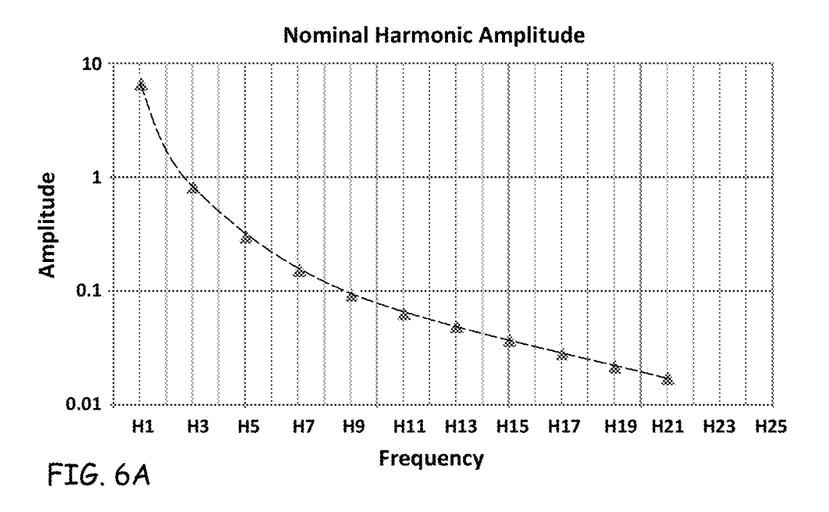
FIG. 6A is a plot of harmonic amplitude response versus frequency.

FIG. 6A is a plot of harmonic amplitude response versus frequency. The nominal harmonic amplitude of the conditioned test signal (A/D output) is given on the vertical axis, in Volts peak. Frequency is given on the horizontal axis, in harmonics of the modulation frequency.

Figure 6B:
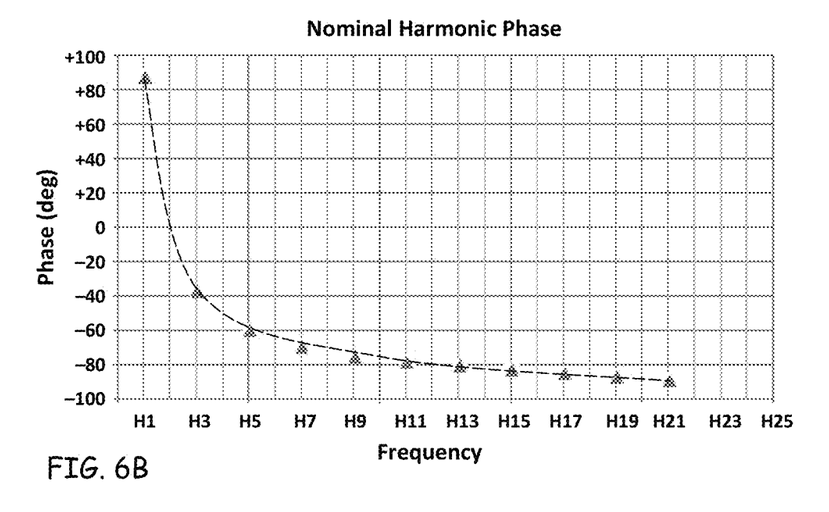
FIG. 6B is a plot of harmonic phase response versus frequency.

FIG. 6B is a plot of harmonic phase response versus frequency, corresponding to the amplitude response plot of FIG. 6A. The nominal harmonic phase is given on the vertical axis, in degrees (deg). Frequency is given on the horizontal axis, in harmonics of the modulation frequency.

FIGS. 6A and 6B demonstrate the results of harmonic analysis on the A/D output for the integrated (conditioned) test signal of FIG. 5B. As shown in the figures, the harmonic amplitude drops by two orders of magnitude or more over the frequency range of interest, while the relative phase shifts by a full half cycle (about 180°, or π radians), approaching an asymptotic tail at higher frequency.

In one particular application, the harmonic amplitude drops from 1-10 Volts peak for the first harmonic (H1) to 0.01-0.10 Volts peak for the twenty-first harmonic (H21), corresponding to a critical vibration frequency range of about 1-21 times the modulation frequency. Over the same frequency range, the harmonic phase shifts from positive values of 80-100° (+1.40-1.75 radians) at H1 to negative values of 80-100° (−1.40 to −1.75 radians) at H21.

In this example, the drop in amplitude in FIG. 6A is attributable to a combination of the amplitude response between matching low pass filter 53 and signal conditioning electronics 55 as well as the decaying amplitude of harmonics of the Fourier series of the square wave input. Since the harmonics of the Fourier series of the square wave input are not phase shifted, the phase response depicted in FIG. 6B is attributable to the combined phase response of the matching low pass filter 53 and signal conditioning electronics 55. Nominal values can be computed for amplitude and phase responses, with variations from the nominal values representing errors that may be compensated for when processing data from the vibration sensors 34.

The A/D sample size, sample rate and input signal frequencies are selected in order to minimize bias and computational errors in the harmonic analysis. In addition, there is also an effect due to the variations in the accelerometer signal and cable components, as compared to the matching low pass test signal filter. In general, these errors are small when cutoff frequencies $f_0$ are selected to be substantially above the critical trim balance range, for example with $f_0$=2-5 kHz.

The effects of phase compensation are illustrated in Table 1, showing the uncertainty or expected error in phase before and after phase compensation, based on vibration signal frequency. Table 1 also illustrates temperature effects, which occur when phase composition (test signal injection) and trim balance data acquisition are performed at different temperatures (i.e., during engine or system startup, as compared to hot engine running conditions).

To produce the data in Table 1, a single PWM setting and frequency modulation signal (H1) was used, with harmonic analysis applied over ten or more odd orders to cover a 1/rev vibration frequency range of at least (H1-H21). The harmonic analysis determines the phase shift in the conditioned test signal, producing a curve fit or lookup table for phase compensation as a function of frequency. This allows phase errors in the vibration signals to be corrected in real time during trim balance data acquisition, by adjusting the phase of the vibration signal based on the corresponding shift in the phase of the test signal.

TABLE 1

Phase Error Compensation

| Frequency (harmonic) | Phase Error (deg) | Compensated (deg) | Temp Effect (deg) |
|---|---|---|---|
| H1 | 14.52 | 0.06 | 4.80 |
| H3 | 3.82 | 0.19 | 1.46 |
| H5 | 2.56 | 0.32 | 1.11 |
| H7 | 2.14 | 0.45 | 1.05 |
| H9 | 2.00 | 0.58 | 1.08 |
| H11 | 2.03 | 0.71 | 1.18 |
| H13 | 2.11 | 0.84 | 1.29 |
| H15 | 2.20 | 0.96 | 1.41 |
| H17 | 2.29 | 1.09 | 1.52 |
| H19 | 2.38 | 1.22 | 1.64 |
| H21 | 2.50 | 1.35 | 1.77 |

Table 1 was generated based on a 10-2000 Hz vibration (accelerometer) input bandwidth, but the results are similar up to 3800 Hz. The modulation frequency (H1) can be selected based on an integral ratio of the A/D sample size and sample rate, in order to provide an integer number of cycles for the harmonic analysis. This facilitates the use of an FFT (or DFT) analysis, where the FFT extends over the full A/D sample size (or data buffer), and the full A/D data buffer holds an integral number of cycles of the modulation frequency (H1) and its harmonics For A/D sample size N and sampling frequency fs, for example, the modulation frequency may be selected as fmod=n×(fs)/N, where fs=10 kHz is selected to be above the vibration input bandwidth (i.e. greater than the Nyquist Frequency), and n is an integer of order one. The most common FFT algorithm, in particular, requires that the A/D sample size be value equal to the power of 2. Therefore, for N=4096 and n=4, the modulation frequency is 9.765625 Hz (also for N=1024 and n=1). For N=4096 and n=2, the modulation frequency is 4.8828125 Hz, and for N=4096 and n=8, the modulation frequency is 19.53125 Hz. Similarly, the sampling frequency of 10 kHz can also be varied, for example from 5-20 kHz, or over a broader range of 10-100 kHz, above the corresponding vibration input bandwidth. Since frequency analysis using DFTs or an FFT results in complex values that enable computation of magnitude and phase for given frequencies, the compensation techniques described herein may be used for gain compensation in addition to phase compensation.

As shown in Table 1, the worst-case (uncompensated) phase error ranges from about 2° to almost 15°, with larger errors at low frequency and smaller errors in the middle of the range, from about 70-130 Hz. For the worst case (W/C) error, all contributions are assumed to add constructively, based on the rated tolerances of each individual component in the analog signal conditioning chain, and across the full temperature range of operation.

After compensation, errors are substantially reduced. As shown in Table 1, the error remains less than 1.5° across the entire range of interest, from H1-H21. The worst-case error is also less than 1° for frequencies of H15 and below, and less than 0.5° for frequencies of H7 and below. In relative terms, the worst-case compensated errors are reduced to less than half of the respective uncompensated values at frequencies up to H17, and less than 55% of the uncompensated error across the full harmonic range of H1-H21.

Table 1 also illustrates a temperature effect, which occurs when BIT signal injection is performed at engine startup and monitor initialization, with ambient temperatures at the minimum cold temperature. This compares to vibration sensor and accelerometer data acquisition under hot engine running conditions, with the monitor circuit board at maximum hot temperatures.

The illustrated reduced temperature effect error in Table 1 is the error due only to the temperature sensitive circuit components and their corresponding total error over the temperature environment. By performing the BIT signal injection and compensation only at engine startup, a significant portion of the total error is calibrated out over the entire temperature environment.

To reduce temperature effects, BIT signal injection can be repeated periodically after engine startup, in order to re-calibrate the phase/frequency dependence under a range of different engine conditions and operating temperatures. To reduce the worst-case error to less than 1°, even at lower harmonics H1-H9, BIT signal injection and phase compensation can be performed over particular temperature intervals, for example ±25° C. (±45° F.). This is accomplished either by performing phase calibrations at designated time intervals, for example one or two minutes, more or less, or by monitoring the MON board temperature and performing additional calibrations in each desired temperature interval.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. A system for compensating a vibration signal from a vibration sensor on a turbomachine, the system comprising:
   a low pass filter connected to the vibration sensor to filter the vibration signal;
   a test signal generator for calibrating the signal conditioner, wherein the test signal generator generates a test signal having a base frequency and a modulation frequency;
   a matching filter connected to the test signal generator to filter the test signal, the matching filter having gain and phase characteristics selected to match signal patch characteristics of the test signal with those of the filtered vibration signal;

a signal conditioner to condition the filtered vibration signal, wherein the signal conditioner introduces a phase error into the vibration signal, and comprises an integrator to generate an integrated test signal, and wherein the signal conditioner introduces a phase shift into the filtered test signal; and a processor to compensate the phase error introduced by the signal conditioner by correcting the vibration signal based on the phase shift in the test signal, wherein the processor determines the phase shift in the test signal using a harmonic analysis based on the modulation frequency;

wherein the test signal is a pulse width modulated square wave with a modulated pulse width at the base frequency, wherein an amplitude of the integrated test signal varies with the modulated pulse width, and wherein a period of the integrated test signal varies based on the modulation frequency.

2. The system of claim 1, wherein the turbomachine comprises a gas turbine engine and the vibration sensor comprises an accelerometer positioned proximate a fan section of the gas turbine engine.

3. The system of claim 1, wherein the phase error in the vibration signal is a function of vibration frequency, and wherein the processor compensates for the phase error based on the phase shift and the vibration frequency.

4. The system of claim 1, further comprising a multiplexer connected to the signal conditioner, wherein the multiplexer switches an input of the signal conditioner between the vibration signal and the test signal from the matching filter.

5. The system of claim 4, wherein the multiplexer switches the input of the signal conditioner by grounding the vibration signal and passing the test signal.

6. The system of claim 1, wherein the test signal generator comprises a switch for generating the test signal by switching between a reference voltage and ground.

7. The system of claim 1, further comprising an analog to digital (A/D) converter connected to the signal conditioner for digitizing the integrated test signal to produce an A/D data buffer, wherein the modulation frequency is selected such that the A/D data buffer holds an integral number of test signal periods.

8. The system of claim 7, wherein the processor determines the phase shift in the test signal using a Fourier transform of the A/D data buffer based on the modulation frequency to calculate compensation values at harmonics of the modulation frequency.

9. The system of claim 7, wherein the A/D converter synchronizes acquisition of the A/D data buffer to the test signal by starting A/D acquisition on a rising or falling edge of the test signal at the modulation frequency.

10. The system of claim 7, wherein the system synchronizes the test signal to acquisition of the A/D data buffer by time-stamping a rising or falling edge of the test signal at the modulation frequency and time-stamping a start of A/D acquisition by the A/D converter.

11. The system of claim 1, wherein the signal conditioner introduces a gain error into the vibration signal and a gain shift into the test signal, and wherein the processor compensates for the gain error by correcting the vibration signal based on the gain shift in the test signal.

12. The system of claim 1, wherein the processor compensates for the phase error at different operating temperatures of the signal conditioner.

13. The system of claim 1, wherein the processor compensates for the phase error based on different phase shifts at the different operating temperatures.

14. A method comprising:
sensing a vibration of a turbomachine as a vibration signal based on the vibration;
filtering the vibration signal via a low pass filter;
conditioning the filtered vibration signal in a signal conditioner, wherein the signal conditioner introduces a phase error into the vibration signal;
generating a test signal having a base frequency and a modulation frequency;
filtering the test signal via a matching filter with gain and phase characteristics selected to match signal patch characteristics of the test signal with those of the filtered vibration signal;
calibrating the signal conditioner with the test signal, wherein the signal conditioner introduces a phase shift into the test signal;
performing a harmonic analysis on the test signal to determine the phase shift, wherein the harmonic analysis is based on the modulation frequency; and
compensating for the phase error by correcting the vibration signal based on the phase shift in the test signal;
wherein the test signal has a modulated pulse width at the base frequency, and further wherein conditioning the test signal comprises integrating over the test signal to generate an integrated test signal having a period that varies with the modulation frequency and an amplitude that varies with the modulated pulse width.

15. The method of claim 14, wherein the signal conditioner introduces the phase error as a function of a frequency of the vibration.

16. The method of claim 15, wherein compensating for the phase error comprises compensating for the phase error based on the phase shift and the frequency of the vibration.

17. The method of claim 16, further comprising balancing a trim of the turbomachine based on a phase of the vibration signal.

18. The method of claim 14, wherein calibrating the signal conditioner comprises grounding the vibration signal and injecting the test signal into the signal conditioner.

19. The method of claim 14, wherein calibrating the signal conditioner is repeated at different operating temperatures.

20. The method of claim 19, wherein compensating for the phase error comprises compensating for the phase error based on the phase shift and the different operating temperatures.

21. The method of claim 14, wherein performing the harmonic analysis comprises performing a Fourier analysis on the test signal based on harmonics of the modulation frequency.

22. The method of claim 14, further comprising digitizing the integrated test signal to generate an A/D data buffer, wherein the modulation frequency is selected such that the A/D data buffer holds an integral number of digitized test signal periods.

23. The method of claim 22, wherein performing a harmonic analysis comprises performing a fast Fourier transform on the A/D data buffer, based on the modulation frequency.

24. The method of claim 22, further comprising synchronizing the step of digitizing the integrated test signal by starting acquisition of the A/D data buffer on a rising or falling edge of the test signal at the modulation frequency.

25. The method of claim 22, further comprising synchronizing the step of digitizing the integrated test signal by time-stamping a rising or falling edge of the test signal at the modulation frequency and time-stamping a start of A/D data buffer acquisition.

26. A system for compensating a vibration signal from a vibration sensor on a turbomachine, the system comprising:
   a low pass filter connected to the vibration sensor to filter the vibration signal;
   a test signal generator for calibrating the signal conditioner, wherein the test signal generator generates a test signal having a base frequency and a modulation frequency;
   a matching filter connected to the test signal generator to filter the test signal, the matching filter having gain and phase characteristics selected to match signal patch characteristics of the test signal with those of the filtered vibration signal;
   a signal conditioner to condition the vibration signal, wherein the signal conditioner introduces a gain error into the vibration signal, and comprises an integrator to generate an integrated test signal, and wherein the signal conditioner introduces a gain shift into the filtered test signal; and
   a processor to compensate the gain error introduced by the signal conditioner by correcting the vibration signal based on the gain shift in the test signal, wherein the processor determines the gain shift in the test signal using a harmonic analysis based on the modulation frequency;
   wherein the test signal is a pulse width modulated square wave with a modulated pulse width at the base frequency, wherein an amplitude of the integrated test signal varies with the modulated pulse width, and wherein a period of the integrated test signal varies based on the modulation frequency.

27. The system of claim 26, wherein the gain error in the vibration signal is a function of vibration frequency, and wherein the processor compensates for the gain error based on the gain shift and the vibration frequency.

28. The system of claim 26, further comprising a a multiplexer connected to the signal conditioner, wherein the multiplexer switches an input of the signal conditioner between the vibration signal from the low pass filter and the test signal from the matching filter by grounding the vibration signal and passing the test signal.

29. The system of claim 26, further comprising an analog to digital (A/D) converter connected to the signal conditioner for digitizing the integrated test signal to produce an A/D data buffer, wherein the modulation frequency is selected such that the A/D data buffer holds an integral number of test signal periods.

30. The system of claim 29, wherein the A/D converter synchronizes acquisition of the A/D data buffer to the test signal by starting A/D acquisition on a rising or falling edge of the test signal at the modulation frequency.

31. The system of claim 29, wherein the system synchronizes the test signal to acquisition of the A/D data buffer by time-stamping a rising or falling edge of a start of the test signal at the modulation frequency and time-stamping a start of A/D acquisition by the A/D converter.

32. The system of claim 29, wherein the processor determines the gain shift in the test signal using a Fourier transform of the A/D data buffer based on the modulation frequency to calculate compensation values at harmonics of the modulation frequency.

33. The system of claim 26, wherein the processor compensates for the gain error at different operating temperatures of the signal conditioner.

34. The system of claim 33, wherein the processor compensates for the gain error based on different gain shifts at the different operating temperatures.

* * * * *